United States Patent
Hatayama et al.

(10) Patent No.: US 7,469,163 B2
(45) Date of Patent: Dec. 23, 2008

(54) HOME SERVER

(75) Inventors: Yoshinori Hatayama, Komaki (JP);
Hiroshi Takemura, Aisai (JP); Youko Tanaka, Mizuho (JP)

(73) Assignee: Sanyo Electric Co., Ltd., Osaka (JP)

( * ) Notice: Subject to any disclaimer, the term of this patent is extended or adjusted under 35 U.S.C. 154(b) by 313 days.

(21) Appl. No.: 11/404,054

(22) Filed: Apr. 14, 2006

(65) Prior Publication Data

US 2007/0027967 A1    Feb. 1, 2007

(30) Foreign Application Priority Data

Apr. 14, 2005  (JP)  ............................ P2005-117369
Apr. 12, 2006  (JP)  ............................ P2006-110079

(51) Int. Cl.
*G05B 11/01* (2006.01)
(52) U.S. Cl. ............................ 700/17; 700/83; 709/223
(58) Field of Classification Search ................ 700/9, 700/17, 83, 275; 348/564; 725/37; 709/223
See application file for complete search history.

(56) References Cited

U.S. PATENT DOCUMENTS

| 6,480,753 | B1 * | 11/2002 | Calder et al. ................. 700/83 |
| 7,181,291 | B2 * | 2/2007 | Boldt et al. ................... 700/17 |
| 7,260,604 | B2 * | 8/2007 | Kuki .......................... 709/205 |
| 2002/0111698 | A1 * | 8/2002 | Graziano et al. ............. 700/17 |
| 2002/0147638 | A1 * | 10/2002 | Banerjee et al. .............. 705/14 |
| 2003/0009760 | A1 * | 1/2003 | Sakamoto et al. ............. 725/74 |
| 2004/0100933 | A1 * | 5/2004 | Iwabuchi ................... 370/338 |
| 2004/0139210 | A1 * | 7/2004 | Lee et al. .................... 709/230 |
| 2004/0260427 | A1 * | 12/2004 | Wimsatt ..................... 700/275 |
| 2005/0080879 | A1 * | 4/2005 | Kim et al. ................... 709/219 |

FOREIGN PATENT DOCUMENTS

JP    2003-022224    1/2003

* cited by examiner

*Primary Examiner*—Alexander J Kosowski
(74) *Attorney, Agent, or Firm*—McDermott Will & Emery LLP

(57) ABSTRACT

A home server according to the present invention transmits a screen information including a second apparatus identification information identifying a second apparatus and which correlates with a first apparatus identification information identifying a first apparatus, and operation contents realized through linkage of the first apparatus and the second apparatus.

5 Claims, 11 Drawing Sheets

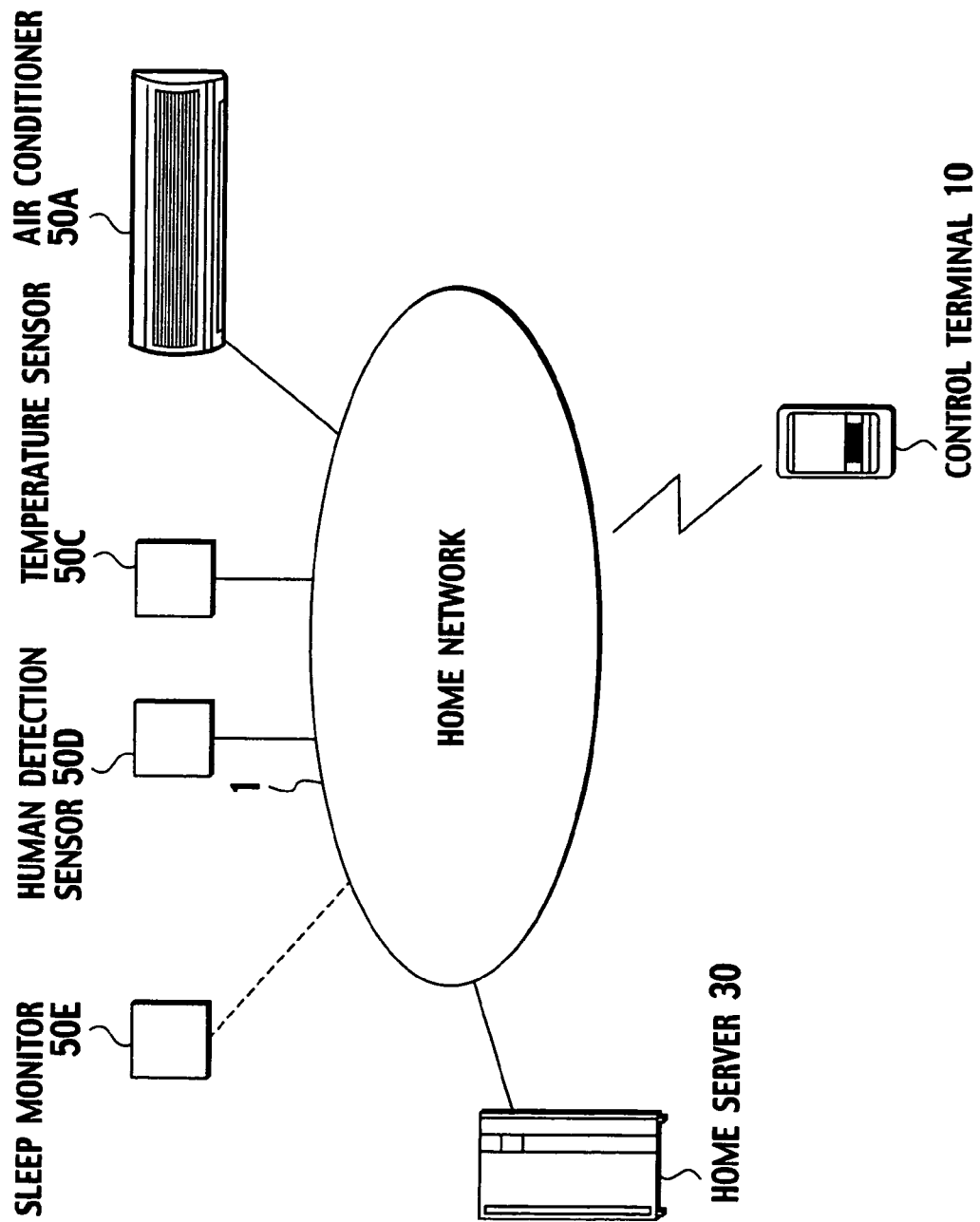

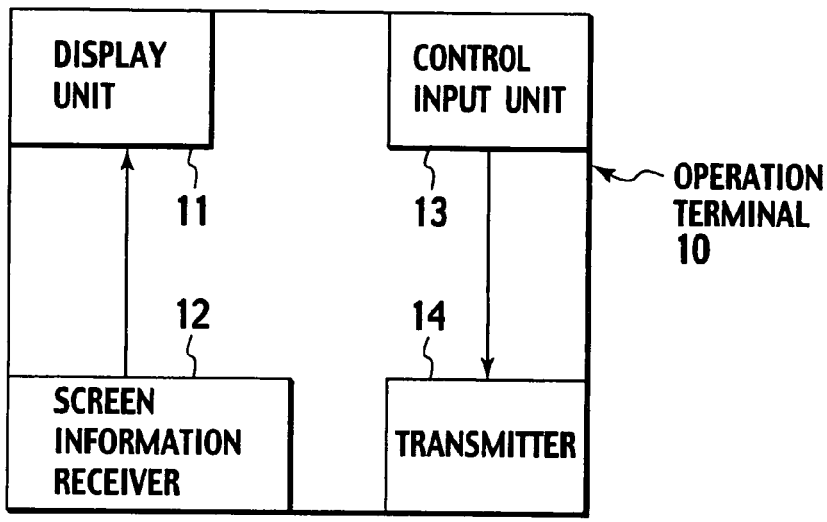
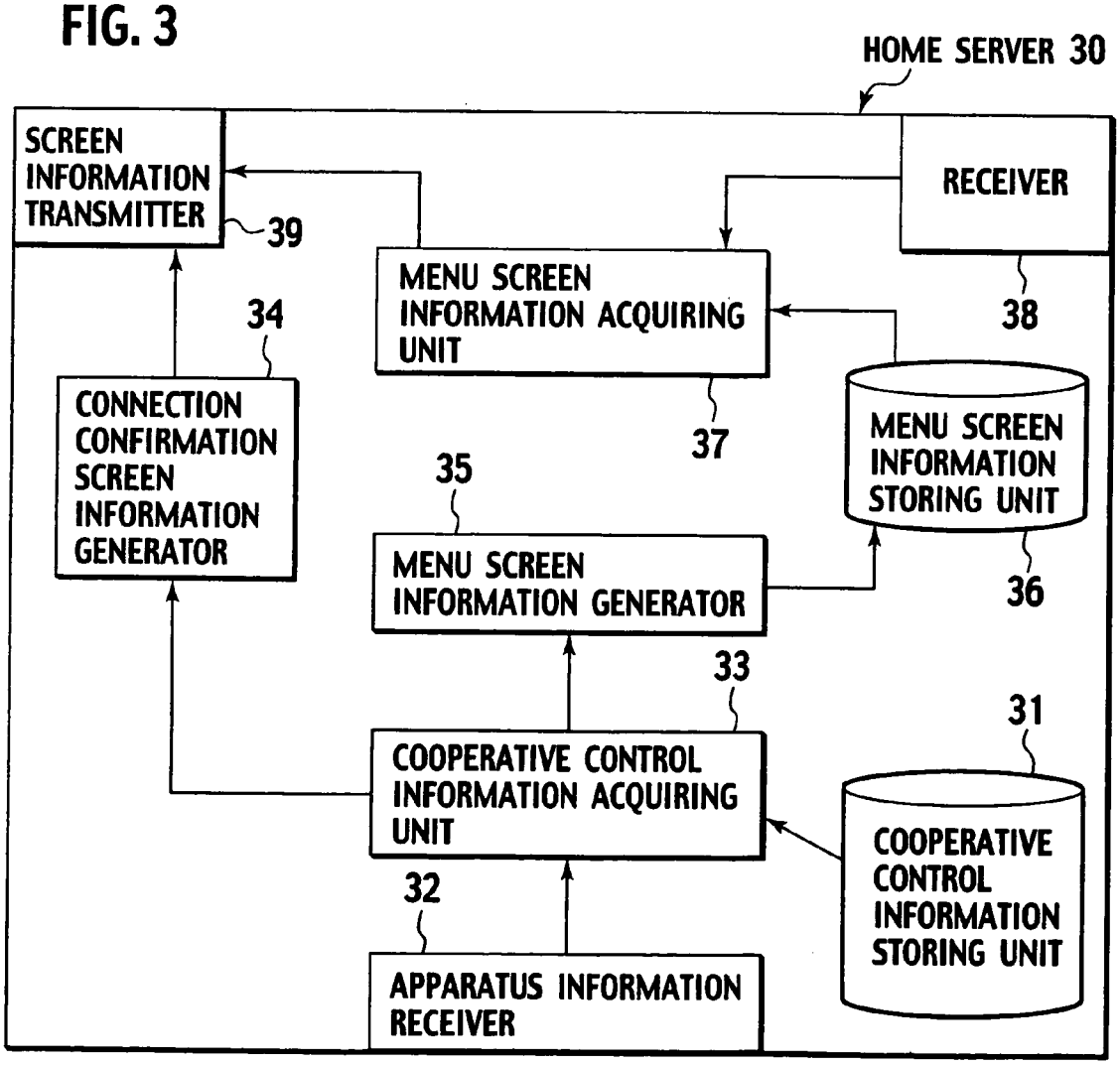

FIG. 4

| APPARATUS INFORMATION #1 (APPARATUS ID INFORMATION) | APPARATUS INFORMATION #2 (APPARATUS ID INFORMATION) | CONTENT/EFFECT |
|---|---|---|
| AIR CONDITIONER (AIR CONDITIONER 50A) | TEMPERATURE SENSOR (TEMPERATURE SENSOR 50C) | STARTING OPERATION WHEN TEMPERATURE HAS BECOME PRESET TEMPERATURE OR LESS (MORE) |
| AIR CONDITIONER (AIR CONDITIONER 50A) | HUMAN DETECTION SENSOR (HUMAN DETECTION SENSOR 50D) | STOPPING OPERATION WHEN STATE THAT NO PRESENCE OF PERSON HAS CONTINUED (AVOIDANCE OF FORGETTING SWITCH-OFF) |
| AIR CONDITIONER (AIR CONDITIONER 50A) | SLEEP MONITOR (SLEEP MONITOR 50E) | STARTING OPERATION WHEN SLEEP HAS BECOME SHALLOW (COMFORTABLE SLEEPING ENVIRONMENT) |

FIG. 5

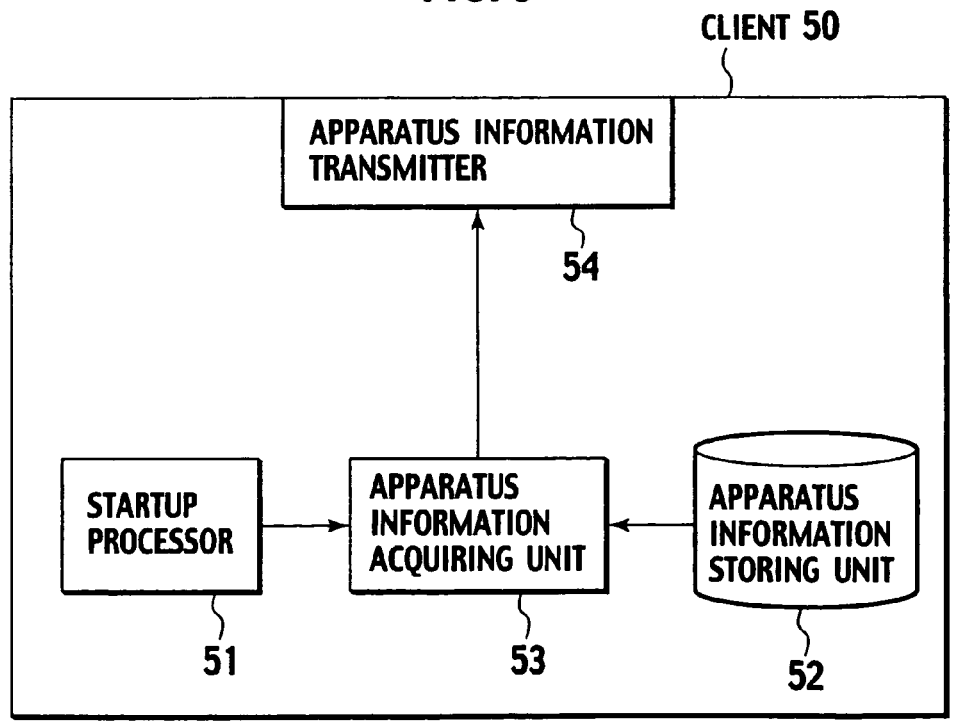

FIG. 7A

```
                AIR CONDITIONER

AIR CONDITIONER HAS BEEN CONNECTED TO
HOME NETWORK

APPARATUSES CAPABLE OF COOPERATING
TEMPERATURE SENSOR : STARTING OPERATION WHEN TEMPERATURE
                    HAS BECOME PRESET TEMPERATURE OR LESS
HUMAN DETECTION SENSOR : STOPPING OPERATION WHEN STATE THAT
                        NO PRESENCE OF PERSON HAS CONTINUED

```
                AIR CONDITIONER

POWER : ON
OPERATION MODE : HEATING
PRESET TEMPERATURE : 20°C

APPARATUSES CAPABLE OF COOPERATING

TEMPERATURE SENSOR : STARTING OPERATION WHEN TEMPERATURE
                    HAS BECOME PRESET TEMPERATURE OR LESS
HUMAN DETECTION SENSOR : STOPPING OPERATION WHEN STATE THAT
                        NO PRESENCE OF PERSON HAS CONTINUED

| APPARATUS INFORMATION #1 (APPARATUS ID INFORMATION) | APPARATUS INFORMATION #2 (APPARATUS ID INFORMATION) | CONTENT/EFFECT |
|---|---|---|
| TELEVISION (TELEVISION RECEIVER 50F) | HDD RECORDER (HDD RECORDER 50G) | ALLOWING CONTENT RECORDED IN HDD RECORDER TO BE VIEWED ON TELEVISION |
| TELEVISION (TELEVISION RECEIVER 50F) | NETWORK CAMERA (NETWORK CAMERA 50H) | DISPLAYING IMAGE TAKEN BY USE OF NETWORK CAMERA ON TELEVISION |

FIG. 10B

| APPARATUS INFORMATION #1 (IDENTIFICATION INFORMATION) | APPARATUS INFORMATION #2 (IDENTIFICATION INFORMATION) | CONTENT/EFFECT |
|---|---|---|
| NETWORK CAMERA (NETWORK CAMERA 50H) | TELEVISION (TELEVISION RECEIVER 50F) | DISPLAYING IMAGE TAKEN BY USE OF NETWORK CAMERA ON TELEVISION |
| NETWORK CAMERA (NETWORK CAMERA 50H) | HDD RECORDER (HDD RECORDER 50G) | RECORDING IMAGE PHOTOGRAPHED BY USE OF NETWORK CAMERA IN HDD RECORDER |
| NETWORK CAMERA (NETWORK CAMERA 50H) | HUMAN DETECTION SENSOR (HUMAN DETECTION SENSOR 50D) | STARTING PHOTOGRAPHING WHEN PERSON IS DETECTED |

_US 7,469,163 B2_

HOME SERVER

CROSS-REFERENCE TO RELATED APPLICATIONS

This application is based on and claims the benefit of priority from the prior Japanese Patent Applications No. P2005-117369, filed on Apr. 14, 2005 and P2006-110079, filed on Apr. 12, 2006; the entire contents of which are incorporated herein by reference.

BACKGROUND OF THE INVENTION

1. Field of the Invention

The present invention relates to a home server connected to a home network along with a plurality of apparatuses operated by a control terminal.

2. Description of the Related Art

As one of characteristics of a home network system placed inside of premises such as a house, there can be cited cooperative control where a plurality of apparatuses (clients) are operated by allowing them in conjunction with one another (for example, Japanese Patent Application publication No. 2003-22224 (pp. 4-6, FIGS. 4 and 5)).

As one example of the cooperative control, there can be cited automated control such as control where an operation of the air conditioner is started (or stopped) when the room temperature becomes a preset temperature or higher by cooperating with a temperature sensor for measuring a room temperature to operate in conjunction with the air conditioner.

SUMMARY OF THE INVENTION

In the abovementioned conventional cooperative control, however, the cooperative control can function only after all of the apparatuses involved in the cooperative control, such as the temperature sensor and the air conditioner, have been connected to a home network.

Therefore, it is not easy for a user of the home network, who does not have much knowledge of the cooperative control, to recognize what operation content is realized by cooperating which apparatus and which apparatus. As a result, there has been a problem that the cooperative control often cannot be fully utilized.

The present invention was made in view of this situation, and aims at offering a home server which can promote utilization of the cooperative control in the home network.

In order to solve the aforementioned problem, the present invention includes the following characteristics. First, a first characteristic of the present invention is summarized as a home server connected to a home network along with a plurality of apparatuses operated by a control terminal. The home server includes a screen information processor configured to transmit a screen information including a second apparatus identification information identifying a second apparatus and which correlates with a first apparatus identification information identifying a first apparatus, and operation contents realized through linkage of the first apparatus and the second apparatuses.

According to this characteristic, it becomes possible to allow a user of a home network, who does not have much knowledge of the cooperative control, to recognize through a screen on the control terminal which operation contents are realized, that is, whether or not convenience of the home network is enhanced by connecting which apparatus (the second apparatus) to the home network in addition to an apparatus (the first apparatus) already having been connected to the home network.

In other words, according to this characteristic, utilization of the cooperative control in a home network can be promoted, whereby a chance of newly purchasing the apparatus can be created.

A second characteristic of the invention is the home server according to the first characteristic, and is summarized as the home server characterized by further including a cooperative control information storing unit configured to store a cooperative control information in which operation contents realized through linkage of the first apparatus and the second apparatus is correlated, and the screen information processor generates the screen information by referring to the cooperative control information stored in the cooperative control information storing unit, and transmits the generated screen information to the control terminal.

A third characteristic of the invention is the home server according to the first characteristic, and is summarized as the home server characterized in that, the screen information processor generates the screen information and transmits the generated screen information to the control terminal when the screen information processor has received an apparatus information including the first apparatus identification information from the first apparatus having been connected to the home network.

A fourth characteristic of the invention is the home server according to the first characteristic, and is summarized as the home server characterized in that, the screen information processor generates the screen information and transmits the generated screen information to the control terminal when the screen information processor has received a request from the control terminal for operating the first apparatus having been connected to the home network.

A fifth characteristic of the invention is the home server according to the first characteristic, and is summarized as the home server characterized in that the screen information processor generates a screen information including the second apparatus identification information which is associated with the first apparatus identification information and which identifies the second apparatus having not been connected to the home network and the operation contents, and transmits the generated screen information to the control terminal.

A sixth characteristic of the invention is the home server according to the first characteristic, and is summarized as the home server characterized in that, an apparatus detail information on the second apparatus is associated with the second apparatus identification information; the home server further comprises a detail information request receiver configured to receive an apparatus detail information request of the second apparatus, which is transmitted from the control terminal based on the screen information transmitted by the screen information processor; and the image information processor transmits a screen information including the apparatus detail information to the control terminal when the apparatus detail information request receiver receives the apparatus detail information request.

A seventh characteristic of the invention is the home server according to the first characteristic, and is summarized as the home server characterized in that: a purchase information regarding a purchase of the second apparatus is associated with the second apparatus identification information; the home server further comprises a purchase information request receiver configured to receive a purchase information request of the second apparatus, which is transmitted from the control terminal based on the screen information transmitted by the screen information processor; and the screen information processor transmits a screen information including the purchase information to the control terminal when the purchase information request receiver receives the purchase information request.

BRIEF DESCRIPTION OF THE DRAWINGS

FIG. 1 is a configuration diagram of a home network according to a first embodiment of the present invention.

FIG. 2 is a logical block configuration diagram of a control terminal according to the first embodiment of the invention.

FIG. 3 is a logical block configuration diagram of a home server according to the first embodiment of the invention.

FIG. 4 is a table showing one example of cooperative control information according to the first embodiment of the invention.

FIG. 5 is a logical block configuration diagram of a client connected to the home network according to the first embodiment of the invention.

FIGS. 7A and 7B are illustrations showing examples of a connection confirmation screen and a menu screen, respectively, according to the first embodiment of the invention.

FIGS. 10A and 10B are illustrations showing examples of cooperative control information according to the second embodiment of the invention.

DESCRIPTION OF THE PREFERRED EMBODIMENT

Figure 6:
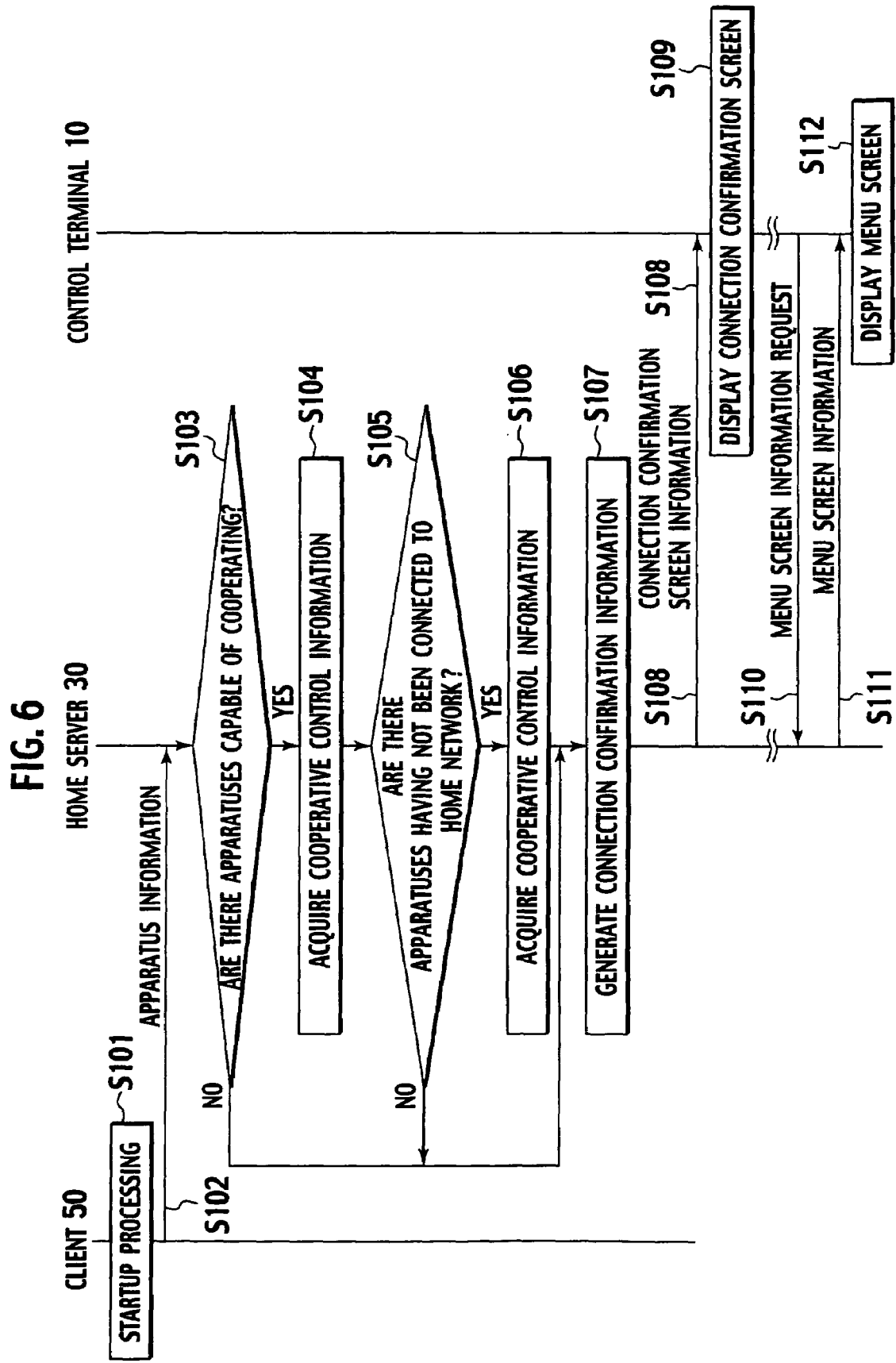
FIG. 6 is a flowchart showing an operational flow of the home server and the control terminal according to the first embodiment of the invention.

Next, embodiments of the present invention will be described. Incidentally, in the descriptions below on the drawings, corresponding or like reference numerals are attached to corresponding or like elements. However, it should be noted that the drawings are schematic, and that ratios of measurements, and the like in the drawings are not to scale.

Accordingly, specific measurements and the like should be judged in considerations of the following descriptions. Additionally, it goes without saying that portions of which a relation and a ratio of measurements are different also between the drawings are included in the drawings.

[First Embodiment]

A first embodiment of the present invention will be described below.

(Configuration of Home Network Including Home Server)

First, a configuration of a home network including a home server according to this embodiment will be described. FIG. 1 is a configuration diagram of a home network 1, which includes a home server 30 according to this embodiment.

As shown in FIG. 1, a plurality of apparatuses (clients), for example, an air conditioner 50A, a temperature sensor 50C, a human detection sensor 50D, and a sleep monitor 50E (as appropriate, each of which will be referred to as the "client 50" for short), are connected to the home network 1. The temperature sensor 50C, the human detection sensor 50D and the sleep monitor 50 can operate through linkage with the air conditioner 50A.

Additionally, a control terminal 10 and the home server 30 are also connected to the home network 1.

The control terminal 10 is a remote control terminal (controller) for controlling plural clients 50 connected to the home network 1 and for checking states of the clients 50.

(Logical Block Configuration)

FIG. 2 is a logical block configuration diagram of the control terminal 10. As shown in FIG. 2, the control terminal 10 is provided with a display unit 11, a screen information receiver 12, a control input unit 13 and a transmitter 14.

The display unit 11 is configured to display a screen such as a connection confirmation screen or a menu screen, based on screen information such as connection confirmation screen information or menu screen information received by the screen information receiver 12.

The connection confirmation screen is a screen indicating that any one of the clients 50 is connected to the home network 1. FIG. 7A shows an example of the connection confirmation screen. As shown in FIG. 7A, in the connection confirmation s screen, there are displayed: a fact that a first apparatus (for example, the air conditioner 50A) has been connected to the home network 1; second apparatuses (for example, the temperature sensor 50C and the human detection sensor 50D) which can operate through linkage with the first apparatus; and operation contents realized through linkage of the first apparatus and the second apparatuses (for example, starting an operation when a temperature has become a preset temperature or less and stopping the operation when a state that no presence of a person has continued).

The menu screen is a screen indicating operation contents of the first apparatus, and stares of the first apparatus. FIG. 7B shows an example of the menu screen. As shown in FIG. 7B, in the menu screen, there are displayed: states (for example, a power source is ON, an operational mode is heating and a preset temperature is 20° C.) of the first apparatus (for example, the air conditioner 50A); the second apparatuses (for example, the temperature sensor 50C or the human detection sensor 50D) which can operate through linkage with the first apparatus; and the operation contents realized through linkage of the first apparatus and the second apparatuses (for example, starting an operation when a temperature has become a preset temperature or less and stopping the operation when a state that no presence of a person has continued).

The screen information receiver 12 receives screen information such as the connection confirmation screen information or the menu screen information transmitted from the home server 30, and outputs the screen information to the display unit 11.

The control input unit 13 acquires a control content (including a menu screen information request) of the client 50 inputted by a user. Additionally, the control input unit 13 outputs the acquired control content to the transmitter 14.

The transmitter 14 transmits the control content outputted by the control input unit 13 to the home server 30.

FIG. 3 is a logical block configuration diagram of the home server 30. As shown in FIG. 3, the home server 30 is provided with a cooperative control information storing unit 31, an apparatus information receiver 32, a cooperative control information acquiring unit 33, a connection confirmation screen information generator 34, a menu screen information generator 35, a menu screen information storing unit 36, a menu screen information acquiring unit 37, a receiver 38 and a screen information transmitter 39.

The cooperative control information storing unit 31 has stored cooperative control information. FIG. 4 shows an example of the cooperative control information stored in the cooperative control information storing unit 31.

The cooperative control information storing unit 31 stores the cooperative control information in which first apparatus identification information (apparatus information #1 shown in FIG. 4), second apparatus identification information (apparatus information #2 shown in FIG. 4) and operation contents (including an effect) realizable through linkage of the first apparatus and the respective second apparatuses are associated with one another. The first apparatus identification information identifies the first apparatus (for example, the air conditioner 50A), and the second apparatus identification information identifies the second apparatus (for example, the temperature sensor 50C).

The apparatus information receiver 32 shown in FIG. 3 receives apparatus information including identification information identifying a first apparatus (the first apparatus identification information) via the home network 1 from the first apparatus (for example, the air conditioner 50A) having been newly connected to the home network 1.

The cooperative control information acquiring unit 33 is configured to acquire the cooperative control information from the cooperative control information storing unit 31 when the apparatus information receiver 32 has received apparatus information, based on apparatus identification information (for example, the apparatus identification information which identifies the air conditioner 50A) included in the received apparatus information.

The connection confirmation screen information generator 34 generates, based on the cooperative control information acquired from the cooperative control information acquiring unit 33, connection confirmation screen information including: apparatus identification information of the second apparatus (the second apparatus identification information) (for example, the temperature sensor 50C) which is associated with the apparatus identification information of the first apparatus (the first apparatus identification information) (for example, the air conditioner 50A); and operation contents which can be operated through linkage of the first apparatus and the second apparatuses.

Incidentally, the connection confirmation screen information generator 34 may generate connection confirmation screen information including: apparatus identification information (the second apparatus identification information) which is associated with the apparatus identification information of the first apparatus (the first apparatus identification information), and identifies the second apparatus having not been connected to the home network 1 (for example, the sleep monitor 50E); and operation contents.

In other words, the connection confirmation screen information generator 34 can generate the aforementioned connection confirmation screen information with respect to the second apparatus having not been connected to the home network 1, excluding the cooperative control information on the second apparatuses already having been connected to the home network 1.

The menu screen information generator 35 generates, based on the cooperative control information acquired from the cooperative control information acquiring unit 33, menu screen information including the apparatus identification information of the second apparatus (the second apparatus identification information), and the operation contents which are associated with the apparatus identification information of the first apparatus (the first apparatus identification information).

Incidentally, as same as the aforementioned connection confirmation screen information generator 34, the menu screen information generator 35 may generate menu screen information including: Apparatus identification information of the second apparatus (the second apparatus identification information) which is associated with the apparatus identification information of the first apparatus (the first apparatus identification information), and identifies the second apparatuses (for example, the sleep monitor 50E) having not been connected to the home network 1; and operation contents.

In other words, the menu screen information generator 35 can generate the menu screen information with respect to the second apparatuses having not been connected to the home network 1, excluding the cooperative control information on the second apparatuses already having been connected to the home network 1.

The menu screen information storing unit 36 stores the menu screen information generated by the menu screen information generator 35.

The menu screen information acquiring unit 37 acquires the menu screen information on the client 50 (the first apparatus) designated by the control content when the receiver 38 has received a control content (a menu screen information request) from the control terminal 10.

The receiver 38 receives the control content (the menu screen information request) from the control terminal 10. Additionally, the receiver 38 outputs the received control content to the menu screen information acquiring unit 37.

The screen information transmitter 39 is configured to transmit, to the control terminal 10, screen information such as the connection confirmation screen information generated by the connection confirmation screen information generator 34, and the menu screen information acquired from the menu screen information acquiring unit 37.

Incidentally, in this embodiment, the connection confirmation screen information generator 34 and the screen information transmitter 39 constitute the screen information processor. Similarly, the menu screen information generator 35 and the screen information transmitter 39 constitute the screen information processor.

FIG. 5 is a logical block configuration diagram of the client 50 (specifically, the air conditioner 50A, the temperature sensor 50C, the human detection sensor 50D or the sleep monitor 50E).

As shown FIG. 5, the client 50 is provided with a startup processor 51, an apparatus information storing unit 52, an apparatus information acquiring unit 53 and an apparatus information transmitter 54.

The startup processor 51 executes startup processing of the client 50. The apparatus information storing unit 52 stores apparatus information which includes apparatus identification information on the client 50.

The apparatus information acquiring unit 53 acquires the apparatus information on the client 50 having been stored in the apparatus information storing unit 52 when startup of the client 50 is complete. The apparatus information transmitter 54 transmits via the home network 1 the apparatus information of the client 50 acquired from the apparatus information acquiring unit 53 to the home server 30.

(Operation of Home Network Including Home Server)

Next, operation of the home network 1 including the home server 30 according to this embodiment will be described by referring to FIG. 6. Specifically, operation for displaying the connection confirmation screen and the menu screen at the control terminal 10 will be described.

As shown in FIG. 6, in Step S101, the client 50 (the startup processor 51) executes the startup processing to be connected to the home network 1.

In Step S102, the client 50 (the apparatus information transmitter 54) transmits the apparatus information which includes the apparatus identification information on the client 50 (for example, the air conditioner 50A) to the home server having been connected to the home network 1.

In Step S103, the home server 30 (the cooperative control information acquiring unit 33) judges, based on the apparatus identification information of the client 50 (for example, the air conditioner 50A) included in the apparatus information, whether or not there are apparatuses (the second apparatuses) capable of cooperating with the client 50 (the air conditioner 50A).

Specifically, the home server 30 (the cooperative control information acquiring unit 33) judges whether or not the cooperative control information regarding the client 50 (the air conditioner 50A) is stored in the cooperative control information storing unit 31.

If there are apparatuses capable of cooperating with the client 50 (the air conditioner 50A) (YES in Step S103), in Step S104, the home server 30 (the cooperative control information acquiring unit 33) acquires the cooperative control information (refer to FIG. 4) of the client 50 (the air conditioner 50A) from the cooperative control information scoring unit 31.

On the other hand, if there are no apparatuses capable of cooperating with the client 50 (the air conditioner 50A) (NO in Step S103), the home server 30 executes processing in Step S107.

In Step S105, the home server 30 (the cooperative control information acquiring unit 33) judges whether or not there is cooperative control information regarding apparatuses (the second apparatus) having not been connected to the home network 1 among the acquired cooperative control information.

If there is the cooperative control information regarding the apparatus having not been connected to the home network 1 (YES in Step S105) the home server 30 (the cooperative control information acquiring unit 33) acquires the cooperative control information (refer to FIG. 4) of the client 50 (the air conditioner 50A) having been connected to the home network 1 and the different client 50 (for example, the sleep monitor 50E) having not been connected to the home network 1 from the cooperative control information storing unit 31.

In Step S107, the home server 30 (the connection confirmation screen information generator 34) generates connection confirmation screen information including: the identification information of the air conditioner 50A; identification information of the sleep monitor 50E which operates through linkage with the air conditioner 50A; and operation contents realizable through linkage of the air conditioner 50A and the sleep monitor 50E.

Additionally, if it has been judged in Step S103 that there are no apparatuses capable of cooperating with the client 50 (the air conditioner 50A), the home server 30 (the connection confirmation screen information generator 34) generates connection confirmation screen information indicating the only fact that only the air conditioner 50A has been connected to the home network 1.

Furthermore, if it has been judged that there is no cooperative control information regarding the apparatus which has not been connected to the home network 1 (NO in Step S105), in step S101, the home server 30 (the connection confirmation screen information generator 34) generates connection confirmation screen information including operation contents realizable through linkage of the air conditioner 50A and the clients 50 which already has been connected to the home network 1 (for example, the temperature sensor 50C).

In Step S108, the home server 30 (the screen information transmitter 39) transmits the generated connection confirmation screen information to the control terminal 10 via the home network 1.

In Step S109, the control terminal 10 displays the connection confirmation screen on the display unit 11 based on the received connection confirmation screen information (refer to FIG. 7A).

Additionally, when a user of the control terminal 10 75 controls the client 50 (the air conditioner 50A) by using the control terminal 10, processing described below is executed.

In Step S110, the control terminal 10 transmits a control content (a menu screen information request) having been inputted by the user by means of the control input unit 13 to the home server 30.

In Step S111, the home server 30 (the menu screen information generator 35) generates menu screen information based on the received menu screen information request and transmits the generated menu screen information to the control terminal 10.

In Step S112, the control terminal 10 displays the menu screen based on the received menu screen information (refer to FIG. 7B).

(Effects and Advantages)

The home server 30 according to this embodiment makes it possible to allow a user, who does not have much knowledge of the cooperative control, to recognize through a screen on the control terminal 10 what cooperative control can be realized, that is, whether or not convenience of the home network 1 is enhanced, by connecting what client 50 (for example, the sleep monitor 50E) to the home network 1 in addition to the any pre-existing clients 50.

In other words, the home server 30 makes it possible to promote utilization of the cooperative control in the home network 1, thus making it possible to create a chance of newly purchasing the clients 50.

The home server 30 makes it possible to allow a user to recognize, by means of the connection confirmation screen information any time a new one of the clients 50 is connected to the home network 1, the most recent information on what cooperative control can be realized by connecting what client 50 to the home network 1.

The home server 30 makes it possible to allow a user to recognize, by means of the menu screen information, any time the user tries to operate the client 50 already having been connected to the home network 1, the most recent information on what cooperative control can be realized by connecting what client 50 to the home network 1. Accordingly, it is possible to effectively encourage the user to purchase any one of the clients 50.

The home server 30 makes it possible to allow a user to recognize only information on what cooperative control can be realized, together with the different client 50 having already been connected to the home network 1, with respect to the client 50 having not been connected to the home network 1. Accordingly, it is possible to effectively promote utilization of the cooperative control using any one of the clients 50 which the user has not yet owned.

[Second Embodiment]

Next, a second embodiment of the present invention will be described. In this embodiment, cooperative control is executed with respect to audio-visual apparatuses such as a television receiver and a network camera. Additionally, in this embodiment, it is possible to display detail information on an apparatus which can operate through linkage with the other apparatus, and to promote a purchase of the apparatus.

(Configuration of Home Network Including Home Server)

Figure 8:
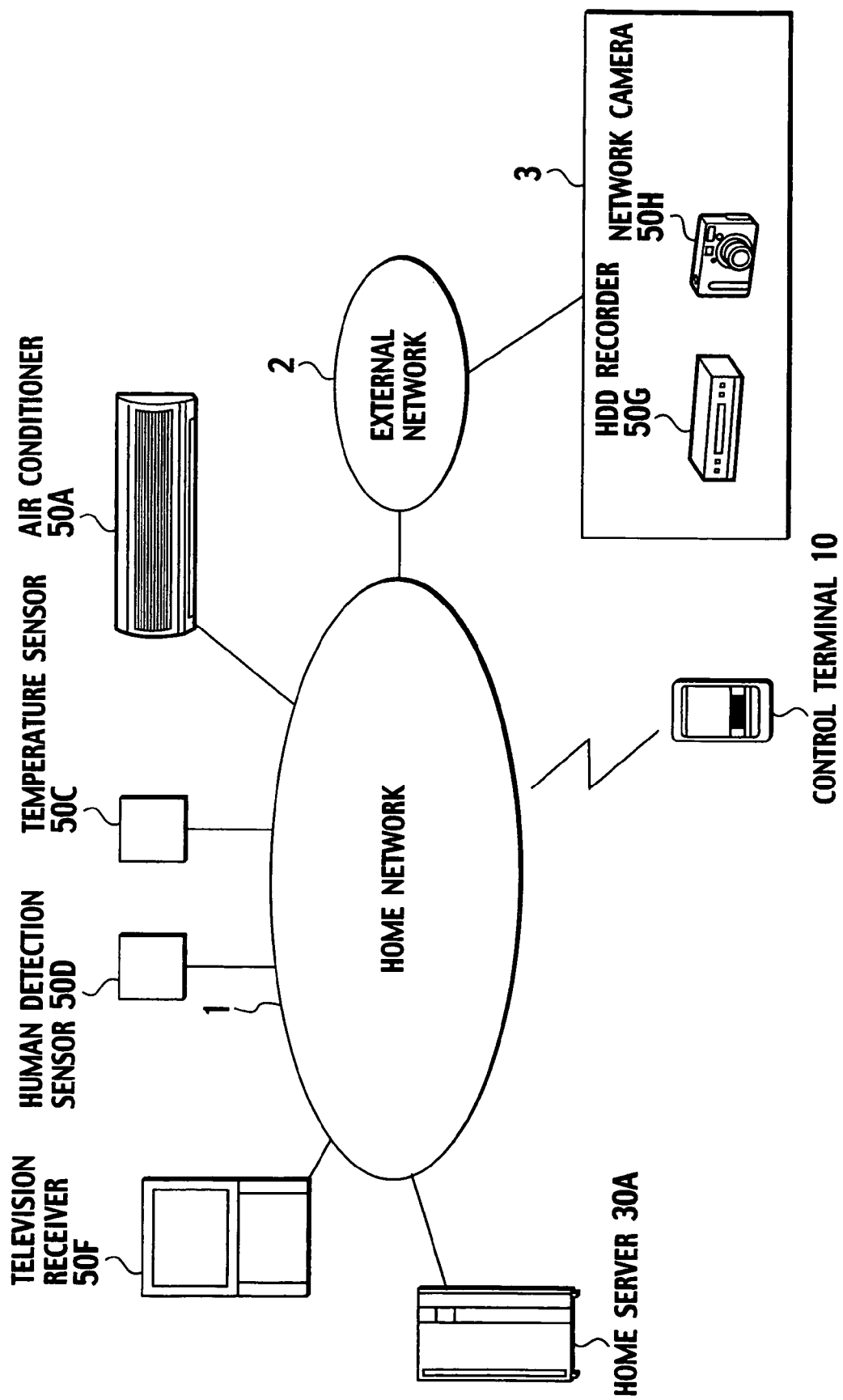
FIG. 8 is a configuration diagram of a home network according to a second embodiment of the invention.

FIG. 8 is a configuration diagram of the home network 1, which includes a home server 30A according to this embodiment. Note that, the following descriptions will be given mainly of portions in which this embodiment differs from the first embodiment, and descriptions on the corresponding portions will be omitted as appropriate.

As shown in FIG. 8, a television receiver 50F is connected to the home network 1 in this embodiment. Additionally, an external network 2 is connected to the home network 1. The external network 2 is constituted of, for example, an IP network including the Internet.

A shopping site 3 selling audio-visual apparatuses and the like is connected to the external network 2. The shopping site 3 is constituted of a web server and the like. In the shopping site 3, users can purchase a hard disk drive (HDD) recorder 50G and a network camera 50H, both of which can operate through linkage with the television receiver 50F.

(Logical Block Configuration)

Figure 9:
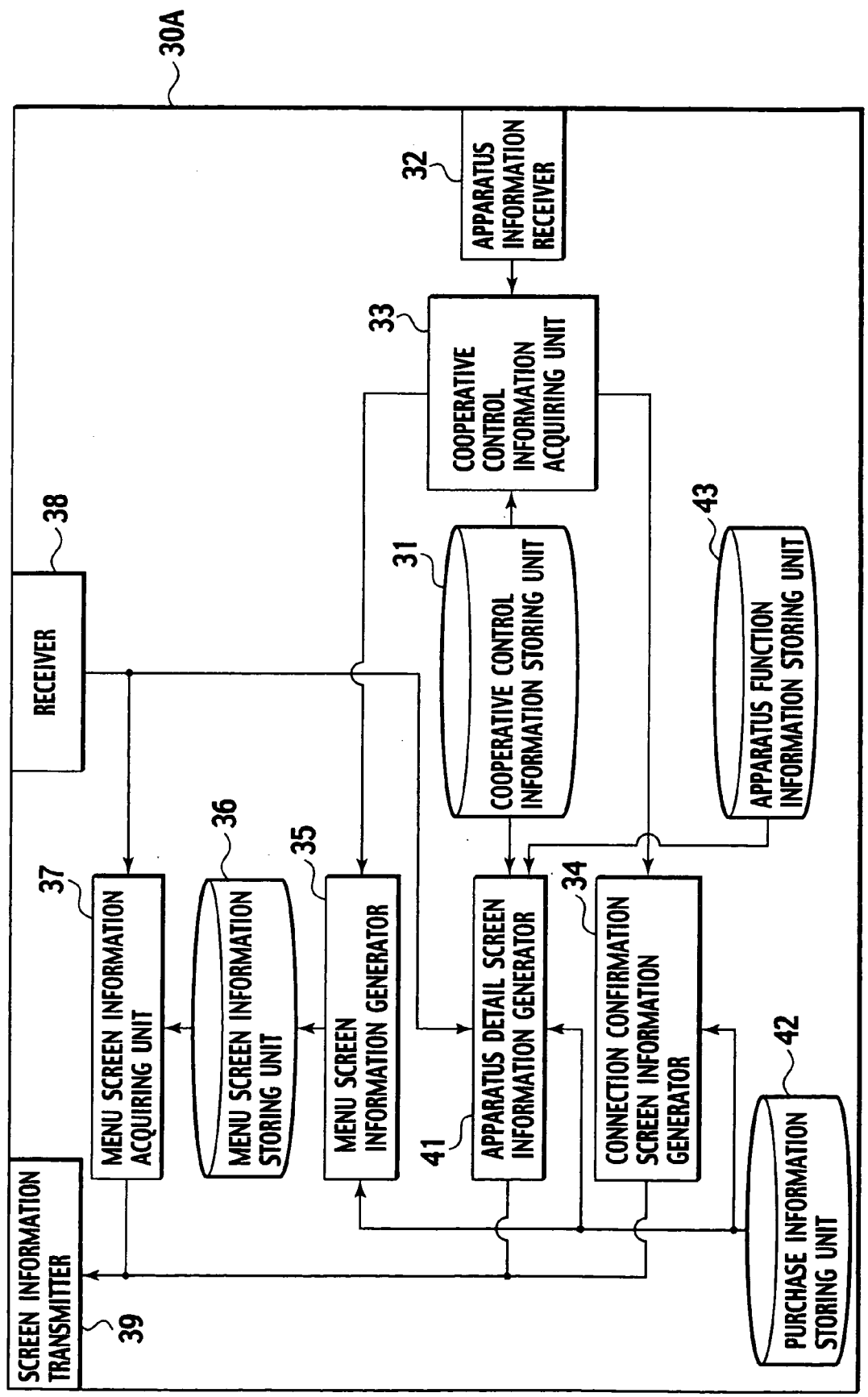
FIG. 9 is a logical block configuration diagram of a home server according to the second embodiment of the invention.

FIG. 9 is a logical block configuration diagram of the home server 30A. As compared with the aforementioned home server 30, an apparatus derail screen information generator 41, a purchase information storing unit 42 and an apparatus function information storing unit 43 are added to the home server 30A.

Additionally, the cooperative control information storing unit 31 according to this embodiment stores cooperative control information regarding the television receiver 50F, the HDD recorder 50G and the network camera 50H. FIGS. 10A and 10B show examples of the cooperative control information stored in the cooperative control information storing unit 31 of the home server 30A. Specifically, FIG. 10A shows the cooperative control regarding the television receiver 50F. In addition, FIG. 10B shows the cooperative control information regarding the network camera 50H.

Furthermore, the cooperative control information storing unit 31 can store detail information (for example, functions of the respective apparatuses, and the apparatuses capable of cooperating) regarding operations of the respective apparatuses, which is included in the cooperative control information. Specifically, in the cooperative control information, the apparatus detail information regarding the apparatus (the second apparatus) capable of cooperating is associated with the apparatus information #2 (the second apparatus identification information). Additionally, in this embodiment, when an addition of, or change in the cooperative control information (or the apparatus detail information) is required owing to introduction of a new apparatus, the cooperative control information storing unit 31 can update contents stored in itself by acquiring necessary information via the external network 2.

The connection confirmation screen information generator 34 and the menu screen information generator 35 generate connection confirmation screen information and menu screen information, respectively, as in the case with the aforementioned home server 30.

Figure 12A:
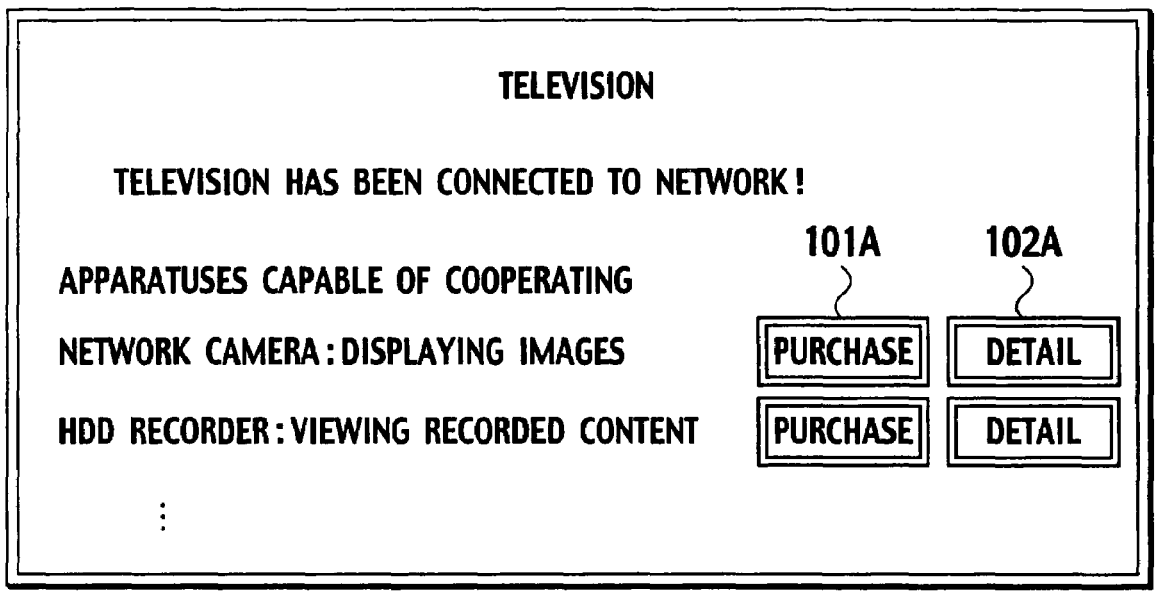
FIGS. 12A and 12B are illustrations showing examples of a connection confirmation screen and a menu screen respectively displayed on the control terminal according to the second embodiment of the invention.
Figure 12B:
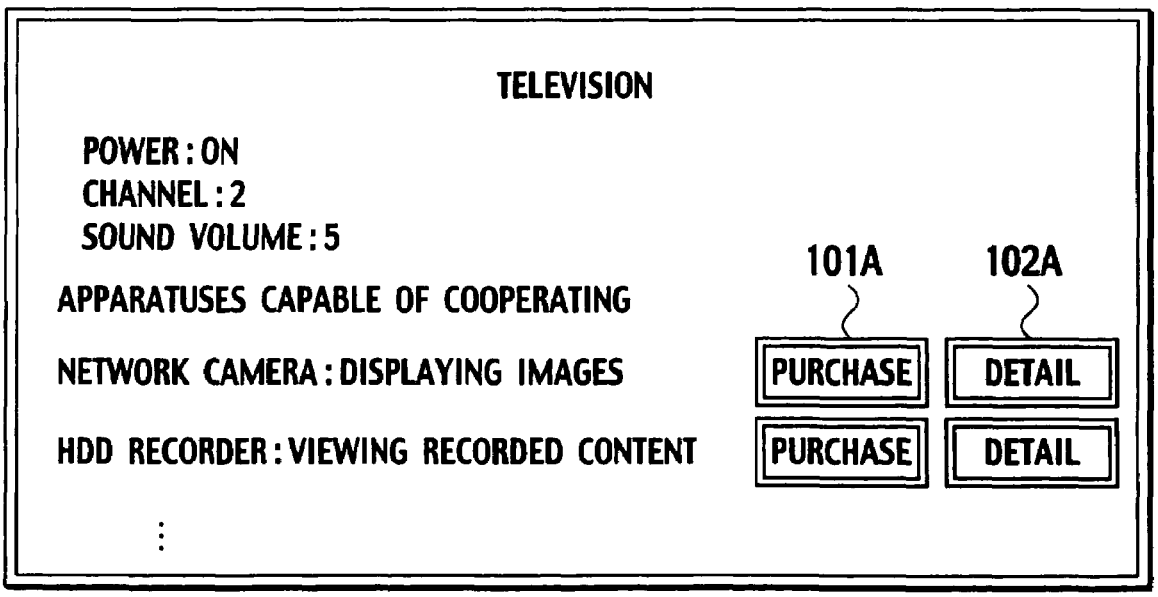

FIGS. 12A and 12B show examples of a connection confirmation screen and a menu screen, respectively, which are displayed on the control terminal 10 based on the connection confirmation screen information and the menu screen information according to this embodiment. As shown in FIGS. 12A and 12B, in each of the connection confirmation and menu screens, purchase icons 101A and detail icons 102A are included.

The receiver 38 according to this embodiment receives an apparatus detail information request of an apparatus (the second apparatus) transmitted from the control terminal 10 based on the connection confirmation screen information having been transmitted to the control terminal 10. Specifically, when a user clicks the detail icon 102A displayed on the control terminal 10, the apparatus detail information request is transmitted from the control terminal 10. In this embodiment, the receiver 38 constitutes a detail information request receiver.

Additionally, the receiver 38 receives a purchase information request of an apparatus (the second apparatus) transmitted from the control terminal 10 based on the connection confirmation screen information having been transmitted to the control terminal 10. Specifically, when a user clicks the purchase icon 101A displayed on the control terminal 10, the purchase information request is transmitted from the control terminal 10. In this embodiment, the receiver 38 constitutes a purchase information request receiver.

The apparatus detail screen information generator 41 generates apparatus detail screen information based on apparatus function information stored in the apparatus function information storing unit 43, and the cooperative control information stored in the cooperative control information storing unit 31. Specifically, when the receiver 38 has received the apparatus detail information request, the apparatus detail screen information generator 41 generates the apparatus detail screen information including the apparatus detail information of the apparatus. Incidentally, the apparatus detail information is configured by the apparatus detail screen information in this embodiment.

The apparatus function information storing unit 43 stores the apparatus function information. The apparatus function information includes information regarding function of the client 50 and whether the client 50 is not connected or connected.

Figure 13A:
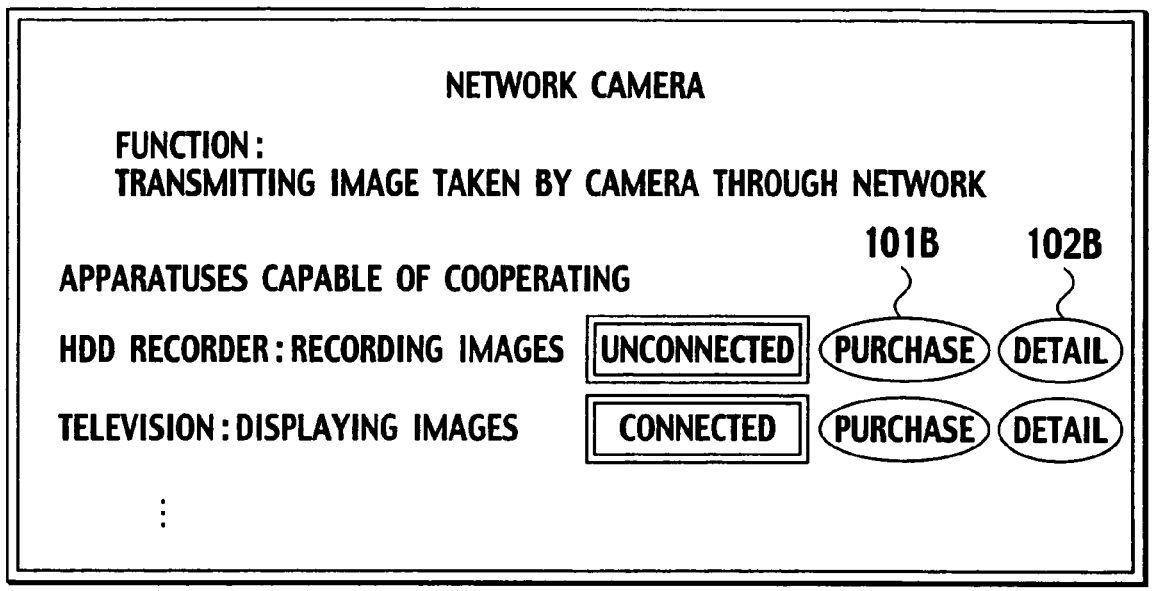
FIGS. 13A and 13B are illustrations showing examples of an apparatus detail information screen and a purchase screen respectively displayed on the control terminal according to the second embodiment of the invention.

The screen information transmitter 39 according to this embodiment transmits the apparatus detail screen information generated by the apparatus detail screen information generator 41 to the control terminal 10. FIG. 13A shows an example of an apparatus detail information screen which is displayed on the control terminal 10 based on this apparatus detail screen information. As shown in FIG. 13A, a function of the network camera 50H (transmission of images taken by the camera through a network), the apparatuses capable of cooperating (the television receiver 50F and the HDD recorder 50G) and the like are displayed on the apparatus detail information screen.

Additionally, on the apparatus detail information screen, whether or not the apparatus capable of cooperating which has already been connected to the home network 1 is displayed so as to discriminate by an icon containing a word "unconnected" or "connected" In the example of FIG. 13A, since the television receiver 50F has already been connected to the home network 1, there is the icon indicating "connected" in a field for the television receiver 50F (a television). Moreover, on the apparatus detail information screen, purchase icons 101B and detail icons 102B are displayed The same function as the purchase icons 100A displayed on the connection confirmation screen (refer to FIG. 12A) is provided to the purchase icons 101B. Additionally, the same function as the detail icons 102A displayed on the menu screen (refer to FIG. 12B) is provided to the detail icons 102B.

The purchase information storing unit 42 stores the URL of the shopping site 3, and the like (purchase information). Specifically, the purchase information of the apparatus (the second apparatus) capable of cooperating is associated with the apparatus information #2 (the second apparatus identification information) shown in FIGS. 10A and 10B. Additionally, when there has been a change in the URL of the shopping site 3, the URL having been stored in the purchase information storing unit 42 is automatically updated based on updated information supplied via the external network 2.

When the receiver 38 has received the purchase information request, the apparatus derail screen information generator 41 can acquire the URL of the shopping site 3 having been stored in the purchase information storing unit 42, and relay the acquired URL to the screen information transmitter 39. The screen information transmitter 39 can transmit the URL relayed by the apparatus detail screen information generator 41 to the control terminal 10.

Additionally, the apparatus detail screen information generator 41 can acquire the URL of the shopping site 3 having been stored in the purchase information storing unit 42, and generates purchase screen information. Specifically, when the receiver 38 has received the purchase information request, the apparatus detail screen information generator 41 generates the purchase screen information including the purchase information of the aforementioned apparatus.

For example, when the receiver 38 has received the purchase information request of the HDD recorder 50G after a user has clicked the purchase icon 101A in the connection confirmation screen shown in FIG. 12A, the apparatus detail screen information generator 41 acquires the URL corresponding with the HDD recorder 50G from the purchase information storing unit 42.

Furthermore, the apparatus detail screen information generator 41 accesses the shopping site 3 based on the acquired URL, and generates the purchase screen information including thumb-nail images of the shopping site 3 containing a price and a time to delivery) for the HDD recorder 50G (the purchase information.

Figure 13B:
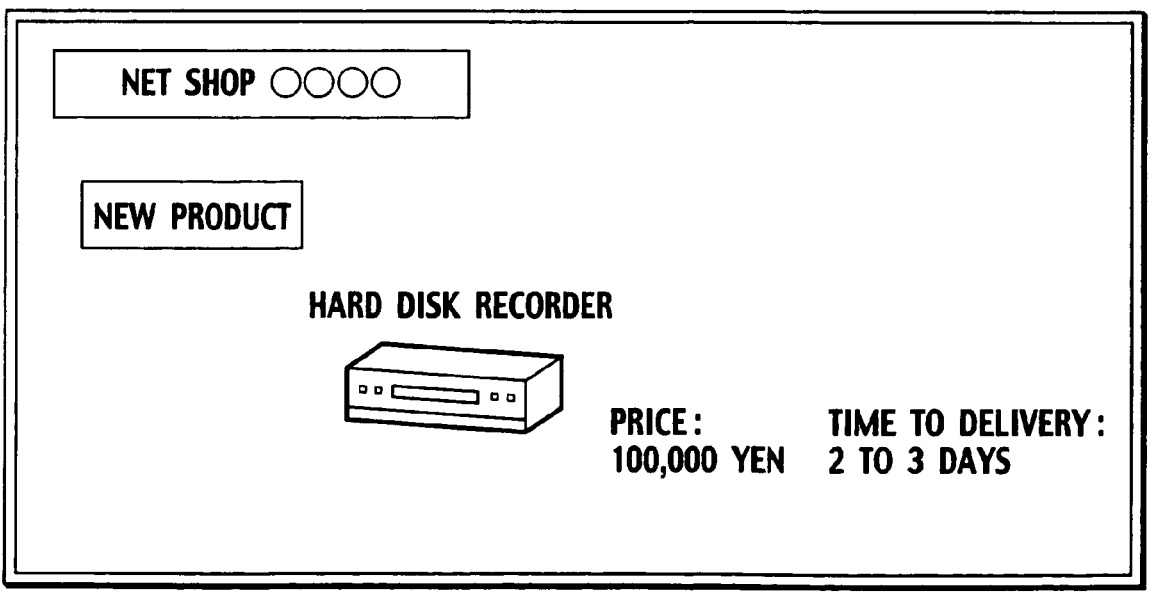

The screen information transmitter 39 can transmit the purchase screen information generated by the apparatus detail screen information generator 41 to the control terminal 10. FIG. 13B shows an example of the purchase screen which is displayed on the control terminal 10 based on the purchase screen information. As shown in FIG. 13B, on the purchase screen, the thumb-nail images of the shopping site 3, which contain the price and time to delivery for the HDD recorder 50G, are displayed.

(Operation of Home Network Including Home Server)

Figure 11:
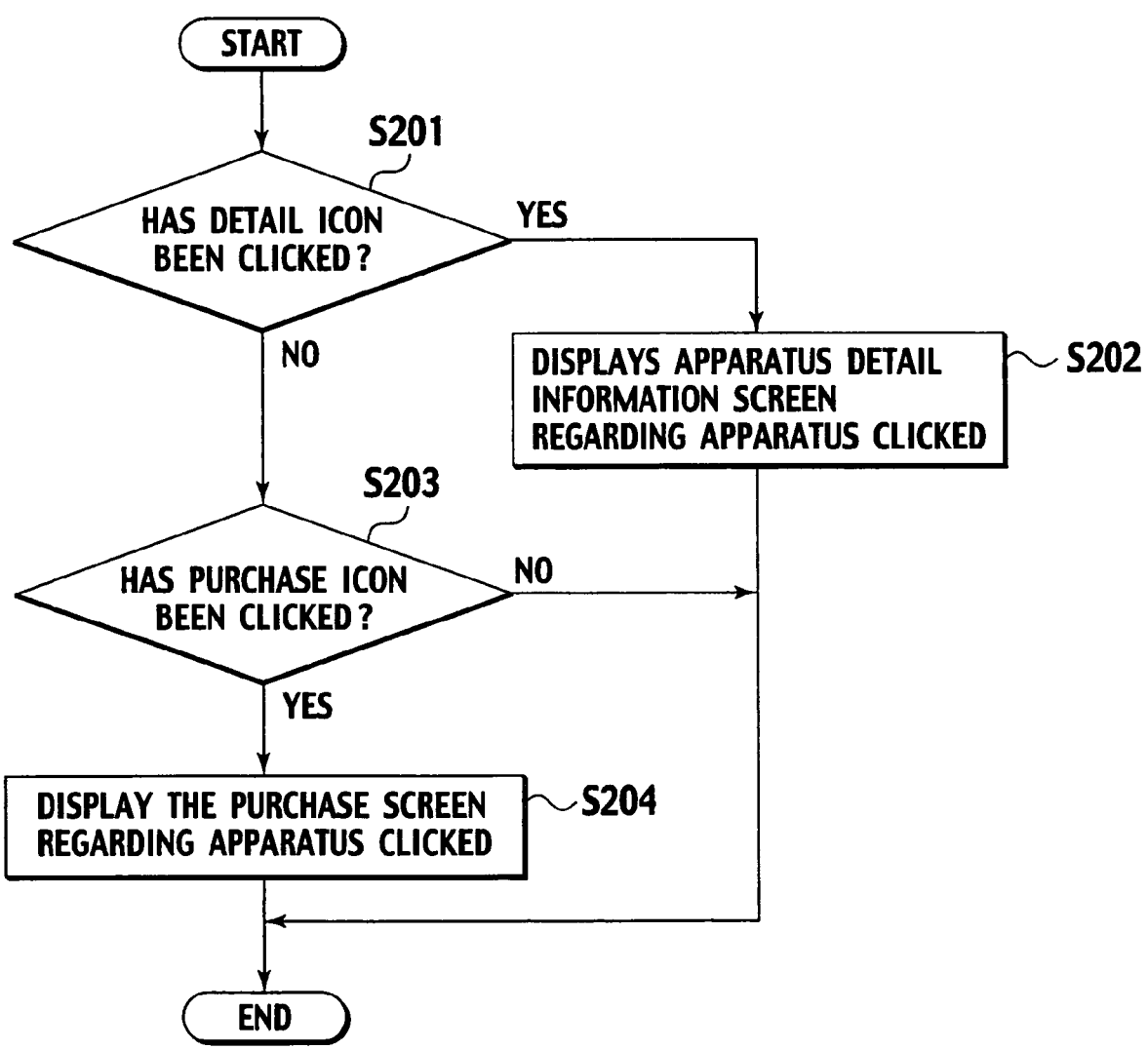
FIG. 11 is a flowchart showing an operational flow of the home server and a control terminal according to the second embodiment of the invention.

Next, operation of the home network 1, which includes the home server 30A according to this embodiment, will be described by referring to FIG. 11. Specifically, operation for displaying the apparatus derail information screen and the purchase screen on the control terminal 10 will be described by mainly referring to operation of the control terminal 10.

In Step S201, the control terminal 10 judges whether any one of the detail icons 102A has been clicked by a user on any one of the connection confirmation screen (refer to FIG. 12A) and the menu screen (refer to FIG. 12B).

If the detail icon 102A has been clicked (YES in Step S201), in Step S202, the control terminal 10 displays the apparatus detail information screen (refer to FIG. 13A) regarding the apparatus (for example, the HDD recorder 50G shown in FIG. 12A).

Specifically, in response to clicking of the detail icon 102A by a user, the control terminal 10 transmits to the home server 30A the apparatus detail information request regarding the HDD recorder 50G. The home server 30A, which has received the apparatus detail information request, generates the apparatus detail screen information, and transmits the generated apparatus detail screen information to the control terminal 10. Based on the received apparatus detail screen information, the control terminal 10 displays the apparatus detail information screen.

If the detail icon 102A has not been clicked (NO in Step S201), in Step S203, the control terminal 10 judges whether any one of the purchase icons 101A has been clicked. Note that orders of Step S201 and Step S203 may be exchanged.

If the purchase icon 101A has been clicked (YES in Step S203), in Step S204, the control terminal 10 displays the purchase screen (refer to FIG. 13B) regarding the apparatus (for example, the HDD recorder 50G shown in FIG. 12A).

Specifically, in response to clicking of the purchase icon 101A by a user, the control terminal 10 transmits to the home server 30A the purchase information request regarding the HDD recorder 50G. The home server 30A, which has received the purchase information request, generates the purchase screen information, and transmits the generated purchase screen information to the control terminal 10. Based on the received purchase screen information, the control terminal 10 displays the purchase information screen.

Incidentally, as has been described above, instead of generating the purchase screen information which causes the control terminal 10 to display the purchase screen (refer to FIG. 13B), the home server 30A may transmit the URL of the shopping site 3, through which the HDD recorder 50G can be purchased, to the control terminal 10. Additionally, any one of the following configurations can be applied to an access to the shopping site 3 from the control terminal 10: a configuration where the access is relayed by the home server 30A, or a configuration where the shopping site 3 is directly accessed from the control terminal 10 into which a web browser has been installed.

Furthermore, in this embodiment, although the apparatus detail screen information is transmitted as soon as the apparatus detail screen information is generated, the apparatus detail screen information generated in advance may be stored and it may be transmitted when request arises.

(Effects and Advantages)

The home server 30A according to this embodiment makes it possible to allow detail information, such as specific functions of apparatuses capable of cooperating, to be displayed on a screen of the control terminal 10. In other words, since it is possible to allow a user to promptly recognize the detail information on the apparatuses capable of cooperating, it is possible to more effectively encourage the user to purchase the HDD recorder 50G and the like.

Additionally, the home server 30A makes it possible to allow purchase information, such as a price and a time to delivery for an apparatus capable of cooperating, to be displayed on the screen of the control terminal 10. In other words, since it is possible to allow a user to promptly recognize the price, the time to delivery and the like for the apparatus capable of cooperating, it is possible to more effectively encourage the user to purchase the HDD recorder 50G.

[Other Embodiments]

As has been described above, contents of the present invention has been disclosed by way of the embodiments of the invention. Meanwhile, it should not be understood that any description or drawing constituting a part of this disclosure limits the invention By this disclosure, various alternative implementations will be obvious to those skilled in the art.

For example, in the above described embodiment of the invention, descriptions have been given by taking the air conditioner 50A, the temperature sensor 50C, the human detection sensor 50D and the sleep monitor 50E as examples of the clients 50 connected to the home network 1. Meanwhile, the clients 50 connected to the home network 1 are not limited to those apparatuses. For example, as the clients 50, a lighting apparatus which can operate through linkage with the human detection sensor 50D, a fan heater which can operate through linkage with the temperature sensor 50C, or the like may be included.

Additionally, the above described embodiment of the invention assumes a configuration where the cooperative control information is displayed on the connection confirmation screen or the menu screen when the client 50 has been connected to the home network 1 or has received the control content (the menu screen information request) from the control terminal 10. Meanwhile, timing when the cooperative control information is displayed is not limited to these timings. For example, the cooperative control information may be displayed on the control terminal 10 (the display unit 11) at predetermined time intervals.

Thus, it goes without saying that the present invention includes various embodiments which are not herein described. Accordingly, a technical scope of the invention should be defined only by specific elements of the invention which are appropriate in view of the above descriptions, and fall within the scope of claim.

What is claimed is:

1. A home server connected to a home network along with a plurality of apparatuses operated by a control terminal, comprising:
    a cooperative control information storing unit configured to store a plurality of cooperative control information in which a first apparatus identification information identifying a first apparatus connected to the home network, a second apparatus identification information identifying at least one of second apparatus which can operate through linkage with the first apparatus, and operation contents realized through linkage of the first apparatus and the second apparatus are associated with one another;
    a cooperative control information acquiring unit configured to judge whether or not there is the cooperative control information regarding an unconnected second apparatus having not been connected to the home network in reference to the plurality of cooperative control information stored in the cooperative control information storing unit;
    a screen information processor configured to generate a screen information including an unconnected second apparatus identification information identifying the unconnected second apparatus and the operation contents realized through linkage of the first apparatus and the unconnected second apparatus, and to transmit the generated screen information to the control terminal, if there is the cooperative control information regarding the unconnected second apparatus.

2. The home server according to claim 1, wherein the screen information processor generates the screen information and transmits the generated screen information to the control terminal when the screen information processor has received an apparatus information including the first apparatus identification information from the first apparatus having been connected to the home network.

3. The home server according to claim 1, wherein the screen information processor generates the screen information and transmits the generated screen information to the control terminal when the screen information processor has received a request from the control terminal for operating the first apparatus having been connected to the home network.

4. The home server according to claim 1, wherein
    an apparatus detail information on the second apparatus is associated with the second apparatus identification information;
    the home server further comprises an apparatus detail information request receiver configured to receive an apparatus detail information request of the second apparatus, which is transmitted from the control terminal based on the screen information transmitted by the screen information processor; and
    the image information processor transmits a screen information including the detail information to the control terminal when the apparatus detail information request receiver receives the apparatus detail information request.

5. The home server according to claim 1, wherein
    a purchase information regarding a purchase of the second apparatus is associated with the second apparatus identification information;
    the home server further comprises a purchase information request receiver configured to receive a purchase information request of the second apparatus, which is transmitted from the control terminal based on the screen information transmitted by the screen information processor; and
    the screen information processor transmits a screen information including the purchase information to the control terminal when the purchase information request receiver receives the purchase information request.

* * * * *